April 7, 1970     E. BOZOYAN     3,504,703

ROTARY SPOOL VALVE

Filed Dec. 7, 1967

INVENTOR.
EDWARD BOZOYAN

United States Patent Office 3,504,703
Patented Apr. 7, 1970

1

3,504,703
ROTARY SPOOL VALVE
Edward Bozoyan, 1812 West St.,
Union City, N.J. 07087
Continuation-in-part of application Ser. No. 528,677,
Jan. 4, 1966. This application Dec. 7, 1967, Ser.
No. 688,760
Int. Cl. F16k 11/08, 5/02, 27/06
U.S. Cl. 137—625.23                                   9 Claims

ABSTRACT OF THE DISCLOSURE

A control valve having a cylindrical rotary spool disposed in a relatively short sleeve with apertured levels and enveloped with an annular manifold at each level. The spool having longitudinal fluid passages in its outer surface and a blank hollow interior for actuation and/or feedback. The passages communicate continuously with conversely cycling fluid-output ports, and upon arcuate rotation of the spool one port is connected with the fluid-supply level and another with the fluid return level.

---

The present application is a continuation-in-part of my application filed Jan. 4, 1966, Ser. No. 528,677, which matured into Patent No. 3,421,544 on Jan. 14, 1969.

BACKGROUND OF THE INVENTION AND OBJECTS

This invention relates to a new concept in fluid control valves, and more particularly, to a sensitive, rotary-type spool control valve, capable of high speed and requiring only minute actuation.

Spool valves presently used in remote control, automatic and servo mechanisms, operate by axially shifting towards one end or the other in the sleeve element. The sleeve is sizably longer than the spool. The housing element is still larger in order to envelop the spool/sleeve assembly. The breadth of the housing is, perforce, many times the diameter of pipings connected to it.

Unequal surface wear and leakage are characteristic of the conventional spool/sleeve assembly since the end portions of the sleeve are in less frictional engagement with the spool than the middle portions.

An important object of this invention is to provide a spool which utilizes minute rotary oscillation instead of axial shifting.

A further object of the invention is to provide a hollow spool having a straight-through axial opening, permitting application of positive drive from within the axial opening and on the exterior surface of the spool as well as at both ends.

Another object of this invention is to provide a fluid control valve wherein the supply inlet passage-way or port and the output passage-way or port are located at its ends and they are parallel to its axis in order to streamline the fluid path across the valve and make it capable of operating in a restricted space as in a tubular member.

In most of the conventional flapper-nozzle type and swing-jet-nozzle type servos, the null position of the power spool, as well as its shifting, positioning, damping, and repositioning are accomplished inside the sleeve through control pressure fluid. The fluid medium can not exercise positive control over the spool since it has power only to "push" the spool from one end at a time and lacks the ability to stop the spool in the precisely correct position. The only means for stopping its motion is to cut off the pressure oil, but this does not effect a synchronous stop for the spool due to several variables to which the latter is subject. This indefinite control of pressure fluid entails a significant increase in system complexity and reliability problems.

2

Accordingly, an object of this invention is to overcome the above shortcoming, (1) by providing means for accepting positive spool control functions, outside the sleeve, (through integrated miniature-size valve-operators and feed-back mechanism), and (2) by minute oscillatory spool travel.

Other objects are to provide a compact, self-contained, and lightweight control device of high flow capacity by means of a plurality of ports feeding each individual actuator port.

BRIEF DESCRIPTION OF THE SEVERAL VIEWS OF THE DRAWING

These and other objects of the invention will be apparent from an examination of the following description and drawing, wherein.

DETAILED DESCRIPTION OF THE PREFERRED EMBODIMENT

In the form of the invention illustrated, a high flow control device has a rotary oscillating spool valve member 10 of generally cylindrical configuration. The axial portion 14 of spool 10 is preferably hollow, having a blank straight-through bore. Spool 10 has a lateral wall with an arcuate outer surface hereinafter referred to as "the critical interface" or, more briefly, "the interface," is processed, in known manner, to mate by fitting into the inner surface of a sleeve member 20.

Figure 1:
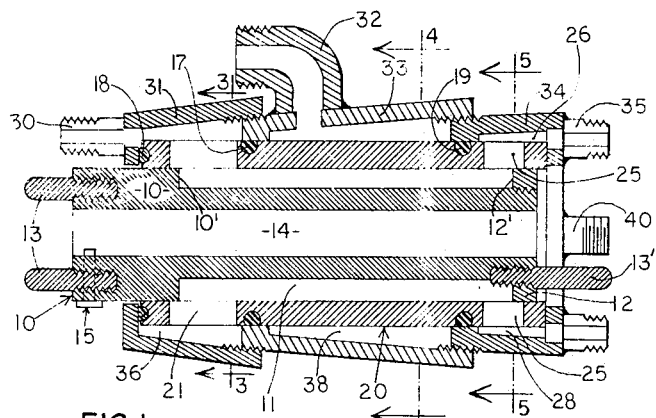
FIGURE 1 is a longitudinal section, partly in elevation, of one embodiment of the invention, showing the device passing output fluid to the first port of an actuator (not shown).
Figure 3A:
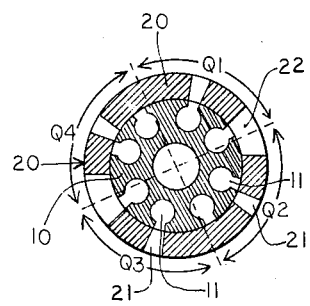
FIGURE 3A is a section of FIG. 1 taken along line 3—3, showing the device receiving supply fluid only through the passages and apertures of quadrants Q1 and Q3, as in the position shown in FIG. 1, some portions being omitted for clarity.

Slightly beneath the interface, running parallel with the interface, spool valve member 10 has eight relatively large-diameter drilled holes 11 (FIGS. 1, 3A). These holes are closed at the drilled end (right side in FIG. 1) by the integral sidewall 12' of a ring 12, which is rigidly secured to spool 10 and forms the right-hand side end portion of the spool and integral part of its interface. The holes 11 are also closed at the right end by the integral sidewall 10' of spool 10. Holes 11 are opened lengthwise at the interface through metering slots, thus forming eight longitudinal fluid passages or channels 11. On its lift-hand side end portion spool 10 is further provided with a pair of driving pins 13 and a lock screw 15, and at its right side by driving or feedback means 13', which will be discussed hereinafter.

Figure 2:
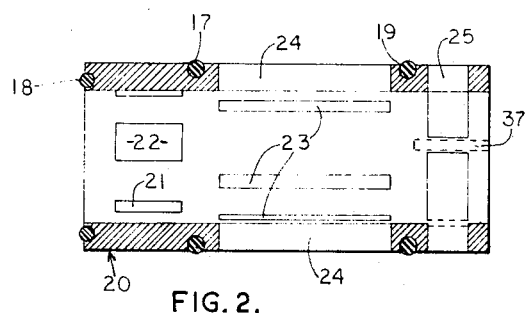
FIGURE 2 is a longitudinal section of the sleeve 20 of FIG. 1 taken on a plane about 30° away from that of FIG. 1.
Figure 3:
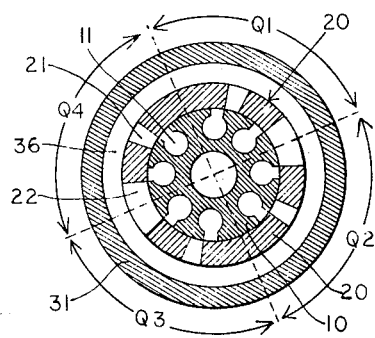
FIGURE 3 is a section of FIG. 1 taken along line 3—3, showing that level of the device in its null position.
Figures 4, 4A, 4B:
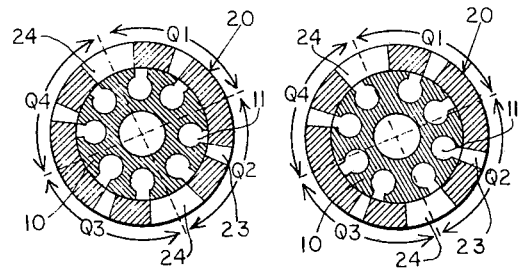
FIGURE 4 is a section of FIG. 1 taken along line 4—4, showing the device in its null position at that level, some portions being omitted for clarity.
FIGURE 4A is a section of FIG. 1 taken along line 4—4, showing the device passing return fluid only through the passages and apertures of quadrants Q2 and Q4, this position corresponding to that of FIG. 1.
FIGURE 4B is a section of FIG. 1 taken along line 4—4, showing the device passing return fluid only through the passages and apertures of quadrants Q1 and Q3.

The sleeve member 20 has a lateral annular wall with an arcuate outer surface, or uniform thickness and staggered apertured portions at three levels. At the level of line 3—3 sleeve 20 has on opposite sides two wide openings referenced as supply apertures 22, and four narrow apertures 21. A conduit ring member 31, continuously communicating with a fluid-supply means (FIGS. 1 and 3), having an annular chamber 36 and one or more, endways inlet nipples 30, feeds supply fluid through apertures 21 and 22, only into those channels 11 which are in registry with these apertures 21 or 22. The axes of nipples 30 are substantially parallel with the axis of spool 10. Similarly, in its middle portion, at the return level where the section along line 4—4 is taken, sleeve 20 has two opposite, wide openings referenced as return apertures 24 (FIGS. 2, 4, 4A, and 4B) and four narrow apertures 23. These return apertures 23 and 24 are disposed in longitudinal staggered relation with respect to the supply apertures 21 and 22, as is clearly illustrated in FIG. 2. A return conduit ring member 33 (FIG. 1), having an annular chamber 38 and a return elbow 32, receives return oil only from these channels 11 which are in registry with the apertures 23 and 24 and conveys it back to the tank through pipings (not shown). When the device is used for air, steam, or vacuum application, conduit members 32–33 may be omitted, since in these applications the exhaust fluid does not necessarily have to return into the tank. Seal members 17, 18, and 19 are provided to prevent possible leakage.

Figure 5:
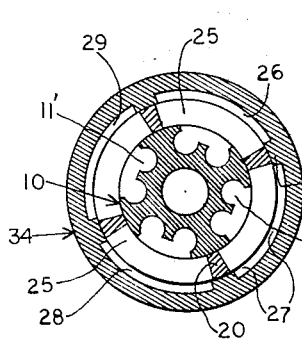
FIGURE 5 is a section of FIG. 1 taken along line 5—5 at the output level of the device and in its null position.
Figure 5A:
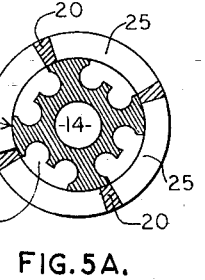
FIGURE 5A is a section of FIG. 1 taken along line 5—5 at the output level of the device and showing the arrangement of the passages and apertures corresponding with the position of FIGS. 1, 3A, and 4A, some portions being omitted for clarity.
Figure 5B:
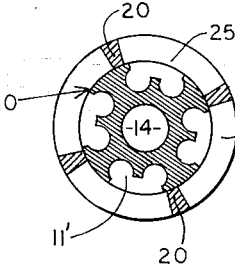
FIG. 5B is a section of FIG. 1 taken along line 5—5 at the output level of the device and showing an arrangement of the passages and apertures corresponding with the position of FIGS. 3B and 4B.

Near the right-hand end portion, at the output level where the section along line 5—5 is taken, sleeve 20 has four very wide output apertures 25. A conduit ring member 34, having output nipples 35, 40, and four small partions 39 overlapping the surfaces 37 (FIG. 2) of the solid portion of sleeve 20, form four identical but seperate output chambers 26, 27, 28, and 29. The axes of nipples 30, 35 and 40 are substantially parallel with the axis of spool 10. Each pair of channels 11 convey fluid only within one particular output chamber and generally this pair never leaves its chamber, thus all of the surface passages or channels 11 are in continuous fluid connection with their respective fluid-output wide apertures 25, chambers 26, 27, 28, 29 (FIG. 5), and fluid-output ports: a pair of nipples 35 and a pair at 40—40. In order to increase the capacity of the channels 11 in the output level 5—5, the solid portion of the spool 10 between each pair of cooperating channels is removed, thereby combining the channels to form a large single channel or passage 11' for each output chamber (FIGS. 5, 5A, and 5B). In order to facilitate the understanding of the relationship between the many apertures at different levels and at different positions, the device may be viewed as being divided into four quadrants Q1, Q2, Q3, and Q4 in accordance with the output chambers 26, 27, 28 and 29.

In operation, when this device is in the null position (FIGS. 3, 4, and 5), all the passages 11 are blocked (closed) at the level 3—3 (FIG. 3) and at the level 4—4 (FIG. 4), but all of them are in fluid connection with their respective output ports without passing any fluid. This results from the arrangement of the apertures so that in the null position none of the passages 11 communicates with the apertures 21, 22, 23, and 24. Consequently, all the output chambers pass neither output nor return fluid.

Figure 3B:
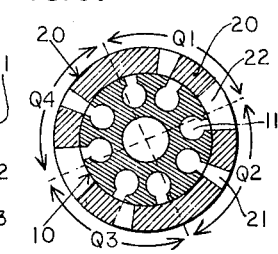
FIGURE 3B is a section of FIG. 1 taken along line 3—3, showing the device receiving supply fluid only through the passages and apertures of quadrants Q2 and Q4.

When the spool is rotated clockwise only about ten degrees, by means which will be described hereinafter, the first limiting (or end) position is reached, which is shown in FIGS. 1, 3A, 4A, and 5A. In these relative positions the passages 11 of output chambers 26 and 28 are brought into register with the supply apertures 21 and 22 of quadrants Q1 and Q3, but they are still blocked at the return level 4—4. Thus, supply fluid enters these open passages and flows out through output chambers 26 and 28, whereupon it is directed to apply to a load by means of an actuator. The term "actuator" is generally used herein to define a fluid motor, a ram cylinder, a rotary actuator, etc., which drive a load. Output fluid of chambers 26 and 28 streaming through the opposite nipples 35 is directed to the same first port of the actuator. Therefore, the two flows have to be properly combined enroute to the actuator port. At this limiting position the passages 11 of opposed output chambers 27 and 29 are still blocked at the supply level 3—3, but they register with the return apertures 23 and 22 of quadrants Q2 and Q4 at the level 4—4. Thus, return fluids from the second port of the actuator enter into chambers 27 and 29 through nipples 40, pass through now open apertures 23, 24 into annular chamber 38 and elbow 32, and back to the tank. As soon as the load is brought to the commanded position, the spool valve member 10 is instantaneously struck into the null position, where all the flows are restrained. When a reverse action is commanded with a negative sense, the spool 10 is rotated counterclockwise approximately ten degrees, to its second limiting position (FIGS. 3B, 4B, and 5B). In these relative positions the passages 11 of quadrants Q2 and Q4 are brought into register with the supply apertures 21 and 22 at the level 3—3, but are blocked at the level 4—4, and the passages 11 of Q1 and Q3 are blocked at 3—3 but are in register at 4—4. Thus, fluids cycle conversely at the output level 5—5: chambers 27 and 29 pass output fluid to the load through the second port of the actuator while chambers 26 and 28 convey return fluids from the first port of the actuator. It will be readily understood that for small command signals the spool valve member 10 does not have to rotate the full ten degrees for operation. In most instances, two or three degrees of rotation will respond to the command signal. From one extreme limiting position to the other extreme limiting position the spool rotary travel is only about twenty degrees.

As is clearly illustrated in FIG. 1, the spool valve member 10 projects outside the sleeve 20 beyond the left-hand side. Furthermore, the inside diameter of annular conduit ring member 34 is greater than the spool outside diameter and thus the spool may also project beyond the right-hand side of the sleeve. As illustrated, rotator drive pins 13 and 13' may be adapted on both projected and retracted ends of the spool 10. One or more lock screws 15 may be adapted on the projected end of the spool to connect it directly with an driving, control or feedback device. Lock screws 15 may attach direct connecting means to the spool both at its external surface and to its exposed hollow interior 14. For instance, a cantilever feedback spring may be operatively inserted in the interior 14 and secured to the spool by the screws 15. These multilateral drive and control attachment features together with that of the minute operative travel, open a promising avenue for new techniques in automatic and servo controls.

All kinds of existing valve-operators may be used to actuate the spool vale member of this device since the amount of rotation is so small. Moreover, in addition to the conventional (mechanical, electrical, electro-mechanical) devices, special miniature size operators for this particular valve are under development, a typical example being disclosed and covered in my pending application filed Jan. 4, 1966, Ser. No. 528,677 which matured into Patent No. 3,421,544 on Jan. 14, 1939. It is evident from the above described multilateral attachments that this spool valve member is capable of being directly coupled to (that is to say, integrated with) its operators.

The feature of spool integration does not significantly affect the spool driving force or its sensitivity, but it restores, in great measures, the capability of the valve to withstand the load disturbance and deflection forces. In the conventional servo valves, the condition is not the same: the spool is displaced by two opposite control forces applied to its ends. The feedback technique is the only recourse for restoring the control of spool displacements. This is a power-wasteful and complex technique. The new valve may greatly reduce this waste of power and the complexity. By integrating the operator and feedback mechnism with the spool, a positive control is achieved and the danger of leakage between the mechanisms is thus apparent that novel, advanced techniques of integrated spool control and feedback, and simpler and more reliable electrical control elements, may be developed upon the basic structure of the instant invention.

In the other spool types each actuator port is fed only by one spool groove; with the instant valve, each port is fed by two opposite output chambers, each chamber being supplied through a pair of passages 11 (11'). Furthermore the output apertures 25, output chambers 26, 27, 28, 29, and output ports 35—35 and 40—40 are endways and unilateral since all are disposed on one side of the device's axis. The latter feature enables the present invention to have a straight-line design and a reduced diametral dimension for a given flow capacity. Each actuator port is thus fed by four passages and the valve is a high flow capacity device.

In the example given by the accompanying drawing, the relationship between the metering edges of the stationary sleeve ports and the passages 11 metering edges, with the spool at null is zero-lapped: that is to say, the edges of the stationary apertures and the channel edges, at the "critical interface" and with the spool at null, are in line-to-line position; the sleeve's arcuate widths cover the passage 11 exactly, the slightest rotation of the spool in either direction starting to uncover certain of the passages. Other relationship than the zero-lapped can be easily obtained, if desired.

It is of importance to note that the arcuate width of the passage 11 may be reduced to very narrow proportions. This width may be as narrow as a knife edge, yet, in the operation of the device, oil will not build up on the edges of passages 11, owing to the ample space behind which is, as stated above, a drilled hole beyond the metering slot of channel 11. Because of the reduced width of passages 11, the full operative travel of the spool 10 is reduced to a very few degrees of rotation. The radial flow capacity is not impaired by the reduction of the passage width since the number of passages may be increased in direct proportion to such passage width reduction. For instance, by disposing seven channels in each quadrant, the channel width will measure only about four degrees and the full operative travel will become as little as eight degrees.

It may be readily seen that, the present device has a balanced structure: at all levels, every passage or aperture has its diametrically opposite, identical counterpart. All the parts have substantially annular configuration and obviate the need of a housing. This feature and the high flow capacity (as above described) contribute to smaller envelope and reduced weight.

The supply, return, and output conduit rings, or mainfolds 31, 33, and 34 are assmbled by thread means and they loosely envelop the sleeve member 20. The loose fit of these three conduit rings allows a safe operation for the device under all conditions; sleeve 20 may expand and contract, axially and radially, without the danger of warping. Although the sleeve member 20 is capable of being rotated, in this instance it is held stationary by means not shown.

In conventional control valves the fluid passes through the coaxial and annular grooves in the valve spool; each groove is traversed by a machined, restricted portion of the spool. The passages 11 (11') of the invention are a series of laterally disposed, elongated, longitudinal grooves which operatively connect in a straight line configuration with both input and output ports.

What is claimed is:
1. In a fluid control device, comprising, a valve member having a lateral wall with an arcuate outer surface, two end portions, and a series of longitudinal passages in said surface, each of said passages being open at said surface and extending from one end portion to the other,
   a sleeve member in rotatable engagement with said outer surface, having apertures operatively coacting with said passages,
   fluid, supply and output means communicating with said passages through said sleeve apertures when they are brought into coaction,
   said output means including more than one output port disposed at one end of the control device,
   said sleeve member apertures being disposed at three levels, the first level comprising a series of supply apertures, the second level a series of output apertures, and the third level a series of return apertures,
   each of said longitudinal passages extending through said three levels and continuously communicating with a respective output aperture and an output port.
2. The device of claim 1, in which one of said valve and sleeve members is rotatable relative to the other member between two limiting positions in order to bring into and out of register, said longitudinal passages and said apertures,
   each of said passages having metering edges with a narrow circumferential width adapted to be made at still narrower proportions and to increase the number of said passages,
   the length of travel of said rotatable member, between said limiting positions, being dependent on said circumferential width,
   each of said longitudinal passages having an interior larger than said circumferential width, thereby preventing oil build-up on said metering edges.
3. The device of claim 2, which is divided into a first pair of coacting quadrants and second pair of coacting quadrants,
   such that when said rotatable member is in the middle of said limiting positions the device is in a null position and it passes no fluid,
   and when the rotatable member is in the first limiting position the passages of the first pair of quadrants register only with their respective supply apertures and pass output fluid, while the passages of the second pair of quadrants register only with their respective return apertures and pass return fluid,
   and when the rotatable member is turned into the second limiting position, the quadrants pass conversely, the second pair registering with its supply apertures and passing output fluid while the first pair pass return fluid.
4. The device of claim 2, in which said valve member has an exposed hollow interior and end portions projected beyond said sleeve member adapted to receive operator means and/or feedback means.
5. The device of claim 1, further including a first conduit ring enveloping said first level of the sleeve member continuously communicating with said series of supply apertures and with said fluid-supply means,
   and a second conduit ring enveloping said second level of the sleeve member, continuously communicating with said series of output apertures and with said output ports.
6. The device of claim 1, in which said output ports are disposed at one end and substantially parallel to the axis of the device,
   said supply means comprising supply ports disposed at the other end and substantially parallel to the axis of the device, whereby fluid path across the device is streamlined.

7. The device according to claim 5, further including a third conduit ring enveloping said third level of the sleeve member, continuously communicating with said series of return apertures and said supply means.

8. In a fluid control device, comprising, an inner valve member, a sleeve member in rotatable engagement with the inner member, two longitudinal axial ends, endways fluid-supply means disposed at one axial end, and endways fluid-output means disposed at the other axial end, said inner valve member having two valve end portions, a lateral wall with an arcuate outer surface, and a series of elongate longitudinal passages in said surface, all of said inner valve surface passages extending from one inner valve end portion to the other, being open at said surface and all being in continuous fluid connection with said fluid-output means, and said inner valve passages being closed at both ends by side walls integral with said inner valve end portion, and said sleeve member having apertures at more than one level, the inner valve passages operatively communicating with said fluid-supply means through the apertures of one level when they are brought into coaction.

9. The device of claim 8, in which said fluid-output means comprises first and second conversely cycling unilateral fluid-output ports in continuous fluid connection with said inner valve surface passages through the apertures of another level of said sleeve member, and said sleeve member having a third level of apertures for fluid return or exhaust means, and the inner valve passages extending through said three levels of apertures.

References Cited

UNITED STATES PATENTS

| | | | |
|---|---|---|---|
| 1,329,881 | 2/1920 | Bloom | 137—625.23 |
| 2,980,138 | 4/1961 | Detweiler et al. | 137—625.23 X |
| 3,291,002 | 12/1966 | Folkerts | 137—625.23 X |
| 3,363,651 | 1/1968 | Boyd | 137—625.23 |

ARNOLD ROSENTHAL, Primary Examiner